Feb. 18, 1941.     W. J. SPENGLER     2,232,645
MAGNETO
Filed July 7, 1937     2 Sheets-Sheet 1

Witness:
Burr W. Jones

INVENTOR.
Walter J. Spengler
BY Norman H. Evans
ATTORNEY.

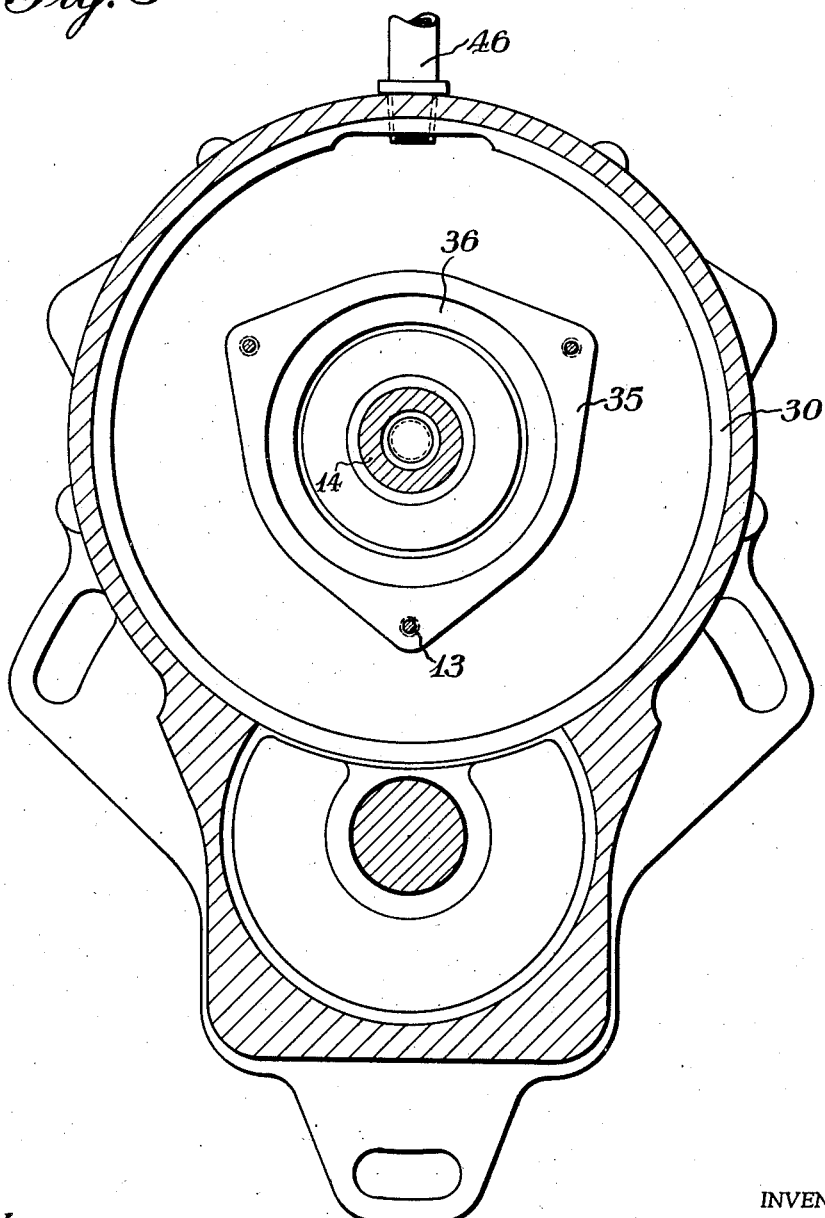

Patented Feb. 18, 1941

2,232,645

UNITED STATES PATENT OFFICE 2,232,645

MAGNETO

Walter J. Spengler, Sidney, N. Y., assignor to Bendix Aviation Corporation, South Bend, Ind., a corporation of Delaware Application July 7, 1937, Serial No. 152,466

10 Claims. (Cl. 171—209)

The present invention relates to a magneto generator, and more particularly to a combined high tension magneto and distributor of the type adapted to be employed for ignition purposes in internal combustion engines. The magneto disclosed in this invention is adapted for use in aircraft and more particularly for aircraft intended for high altitude flying.

It is known that at high altitudes ignition difficulties may arise with conventional ignition systems since the low atmospheric pressure may cause sparking in the magneto distributor rather than in the plugs. Since the insulating value of air decreases with altitude, special provisions to prevent flash-over in the distributor become desirable when the altitude of operation of the device is increased to such an extent as to largely reduce the ambient pressure. Such provisions may take the form of an increase in the dimensions of the distributor in order to increase the flash-over distances, or an alteration of the character of the dielectric medium as by increasing the pressure of the air in the distributor. Increased size is not desirable since the available space on the aircraft engine is very limited, also it would involve increased weight.

An object of this invention is to provide a novel magneto having supercharged air surrounding the distributor.

Another object of the invention is to provide a novel magneto particularly adapted for use at high altitudes.

Another object of the invention is to provide such a magneto generator which is small and compact, yet powerful and efficient.

Another object of the invention is to provide a novel magneto adapted to use compressed air from the supercharger of an internal combustion engine for the purpose of increasing the pressure within the distributor chamber.

A further object of the invention is to provide a magneto having a distributor chamber adapted to be supercharged.

A further object of the invention is to provide such a device including novel packing means to prevent the escape or leakage of the supercharged air from the distributor chamber.

Another object of the invention is to provide such a device including a novel construction of a central electrode.

Still another object of the invention is to provide such a device that includes a novel self-sealing bearing.

Other objects and advantages of the invention will be apparent to those skilled in the art, from the following description taken in connection with the accompanying drawings wherein is illustrated one preferred embodiment of the invention.

In the drawings wherein like reference characters refer to like parts throughout the several views:

Fig. 3 is a vertical sectional view taken substantially on the line 3—3 of Fig. 2.

Figure 1:
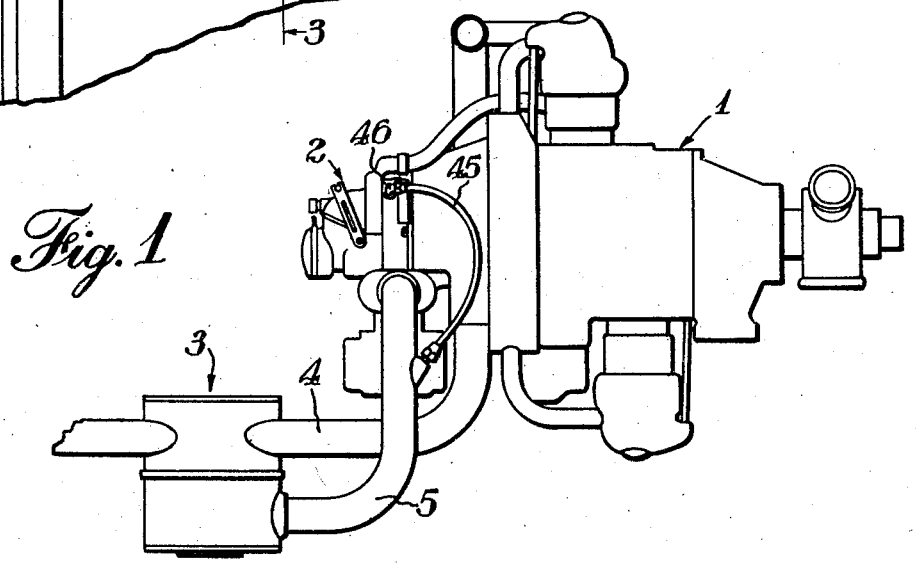
Fig. 1 is a side elevation, partly diagrammatic, of the novel generator mounted on an aircraft engine, showing the connection with the engine supercharger.

Referring first to Fig. 1, there is illustrated semi-diagrammatically a conventional form of aircraft engine 1 having a magneto generator 2 mounted thereon and driven thereby, and provided with a supercharger 3 here illustrated as of the exhaust-driven type, the motor section being connected to the engine exhaust by a conduit 4, and the output thereof being conducted to the carburetor of the engine by a conduit 5.

Figure 2:
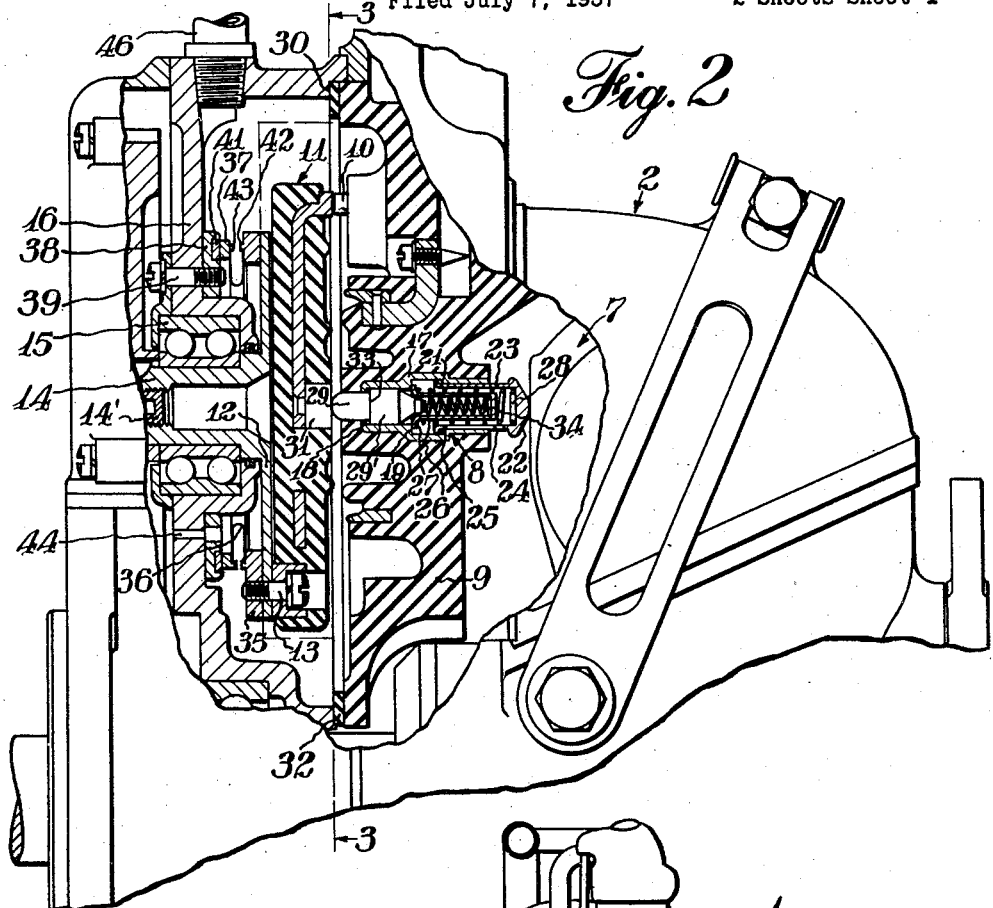
Fig. 2 is an enlarged side elevation of the magneto, partly broken away to show the distributor chamber and packing means constructed in accordance wtih the present invention.

In Fig. 2, 7 represents the high tension coil, and 8 represents generally the central electrode of the magneto distributor. The distributor block 9 is shown in cross section, and showing one of its contacts 10. The distributor finger 11 is shown in cross section and is connected to a drive member 12 by means of a screw 13. The drive member 12 has a shaft portion 14 mounted in a bearing 15 located in the end wall 16 of the distributor chamber.

The distributor block 9 is of novel construction, being circular in shape and it engages the abutment 30 in the wall of the chamber as seen in Figs. 2 and 3. Intermediate therewith is a gasket 32 which seals this engagement.

The central electrode 8 is of novel construction and so constructed that it forms a seal that does not permit pressure from the inside of the distributor chamber to leak out through the electrode. The central electrode 8 has an outer shell 17 so constructed that at one end it has an inwardly protruding shoulder 18, while at the other end it is open. In the middle of the shell 17 there are two outwardly projecting shoulders or abutments 19 and 21. The contact button 22 is formed integral with the shell 23 which makes contact with the high tension coil 7. The shell 23 is slotted as shown at 24 so as to permit it to be collapsed and inserted into the shell 17. The contact shell 23 has at the end opposite the button portion an outwardly projecting ring or lip 26 that engages the shoulder or abutment 21 of the shell 17. The purpose of the ring or lip is to prevent the button from dropping out of the distributor block when it is removed from the magneto. An inner shell 26 is placed in the shell 17. The shell 26 has one end thereof closed and the other end is opened and has a protruding flange member 27 to bear upon the shoulder 19. A stiff spring member 28 is placed within the shell 23 and over the shell 26 bearing upon the flange 27 and maintaining it in sealing engagement with shoulder 19 and also pressing the contact button into engagement with the coil 7.

A contact member or brush 29 preferably in the form of a carbon button is slidably mounted in the shell 17 and adapted to protrude therefrom for engagement with a distributor arm 31. Contact member 29 is provided with an enlarged portion 29' providing a shoulder 33 adapted to engage the inwardly extending shoulder 18 of shell 17 to prevent escape of the said contact member from the distributor block 9. Means in the form of a spring 34 housed in the inner shell 26 is provided for urging the contact member or brush 29 outwardly in engagement with the distributor arm 31. Spring 28 is so constructed as to be stiffer than spring 34 so as to constantly maintain the sealing engagement of the flange 27 of shell 26 against the shoulder 19 irrespective of compression of the contact spring 34.

Since it is necessary to pack the distributor chamber to prevent leakage of the supercharged air therein, it is necessary to have a packing means for the bearing 15 of the shaft 14 to prevent leakage through the bearing. This packing is accomplished by securing a ring-shaped member 35 to the driving element 12. A spring member 36, which as illustrated is in the form of a bellow spring, is utilized to support another ring member 37 to the ring 35. A ring or plate member 38 is secured to the wall of the distributor chamber as by screws 39. Set into this plate or ring 38 is a carbon or other non-metallic ring member 41. The pressure exerted by the spring member 36 upon the ring 37 causes a sealing bearing engagement to be maintained between the ring 37 and the ring 41.

The rings 35 and 37 are provided with annular shoulders 42 and 43 for locating the spring 36 and limiting the collapse of said spring. The shoulders 42 and 43 are spun over as shown, to rigidly hold the spring 36 in place.

The screw member 14' which connects the member 12 to its driving gear prevents an escape of the air or gas out of the chamber through the hollow shaft member 12.

A plurality of vents are located around the bearing such as the vent 44 which is located in the wall of the distributor chamber just beneath the bearing 15 and within the periphery of the rings 37 and 41. In the event that the sealing means of the bearing leaks, the air pressure within the distributor chamber will be conducted out of the chamber by means of these vents, thereby preventing the pressure from blowing the lubricating means out of the bearing 15 with consequent reduction in its efficiency.

According to the present invention, means are provided for supplying air under pressure to the sealed distributor chamber from the engine supercharger 3. As here shown, this is accomplished by means of a tube 45 (Fig. 1) connected at one end with the output conduit 5 of the supercharger, and at the other end with a suitable fitting 46 entering the distributor chamber.

Although but one embodiment of the invention has been shown and described in detail, it will be understood that other embodiments are possible and that various changes may be made in the design and arrangement of the parts without departing from the spirit of the invention as defined in the claims appended hereto.

What is claimed is:

1. A distributor chamber for a high tension magneto, said chamber having in it an electrode, a rotor, a drive member, a first ring, a sealing spring member, a second ring, a third ring, a fourth ring and an end plate, said drive member being attached to the rotor, said first ring being secured to the drive member, said sealing spring member in contact with said first and second rings, said third ring being attached to the fourth ring, said fourth ring being secured to the end plate, the said second ring being in continuous contact with said third ring.

2. In a distributor chamber for a magneto, an electrode, a rotary circuit controlling device, a driving means for said rotary controlling device including a shaft, a bearing mounted on said shaft and in the wall of said chamber, said electrode protruding into the chamber and into contact with said rotary circuit controlling device, means for sealing said electrode and packing means associated with said bearing, said last named means including an annular, bellows type spring.

3. A magneto for internal combustion engines, a distributor chamber in said magneto, said distributor chamber being subject to a pressure greater than the pressure outside of said chamber, said chamber including an air-tight electrode element protruding therein, a rotary switching member, a driving element for said rotary switching member, a shaft for said driving element and a bearing for said shaft fitted in a wall of said chamber, said electrode being in contact with said rotary switching member, packing means in said chamber to prevent a reduction of pressure due to leakage, said packing means including the air-tight electrode element and packing means for the bearing, said last-mentioned packing means including a first ring attached to the driving element, a second ring, a third ring attached to a wall of the chamber, a sealing spring in cooperative relation with the first and second rings, said spring bearing upon the second ring forcing the second ring into a tight contact with the said third ring.

4. In a magneto having a supercharged distributor chamber, said chamber having in it a central electrode member, a rotary switching finger, a driving element for said rotary switching finger, a shaft for said driving element and a bearing on said shaft extending through a wall of the chamber, packing means for said chamber, said packing means comprising a bearing packing element and the central electrode element having a packing element including an outer shell with abutments therein, a brush extending into said shell, one end of said brush extending into an inner shell, said inner shell having a flange abutting the outer shell, another shell having on one end thereof a contact button and extending into said outer shell and over the inner shell, the other end thereof having a flange in contact with an abutment of said outer shell, a spring in said inner shell tending to push out the brush, a stiffer spring over said inner shell forcing the flanges of the inner shell in contact with an abutment of said outer shell.

5. In a magneto having a supercharged distributor chamber, said chamber having in it a central electrode member, a rotary switching finger, a driving element for said rotary switching finger, a shaft for said driving element and a bearing on said shaft extending through a wall of the chamber, packing means for said chamber, said packing means comprising a bearing packing element including a first ring on said driving element, a second ring and a third ring attached to said wall of the chamber and a bellows spring supporting said second ring to the first ring and forcing said second ring into contact with said third ring, and the central electrode element having a packing element including an outer shell with abutments therein, a brush extending into said shell, one end of said brush extending into an inner shell, said inner shell having a flange abutting the outer shell, another shell having on one end thereof a contact button and extending into said outer shell and over the inner shell, the other end thereof having a flange in contact with an abutment of said outer shell, a spring in said inner shell tending to push out the brush, a stiffer spring over said inner shell forcing the flanges of the inner shell in contact with an abutment of said outer shell.

6. A magneto as set forth in claim 5, vents in the wall of the distributor chamber, said vents being within the periphery of the second and third ring and between the spring and the bearing.

7. A magneto generator for internal combustion engines including an enclosed distributor chamber, said distributor chamber being capable of being supplied with a supercharged gas, said distributor being provided with packing means to prevent a reduction of pressure in said chamber by leakage, vents in a wall of said chamber to equalize the pressure within and without said chamber in case said packing means fails.

8. An enclosed supercharged distributor chamber for a magneto generator including an electrode, a rotary switching member, a drive member therefor, a shaft attached to said drive member, a bearing on said shaft and in a wall of said enclosed chamber, packing means for said electrode and for said bearing, said electrode packing means including an outer shell having abutments thereon, an inner shell one end of which having a flange, said electrode fitting into said end, the other end being enclosed, an intermediate shell fitting into and over said outer shell and inner shell respectively, a spring in said inner shell pressing the electrode out, a stiff spring fitting over said inner shell and in said intermediate shell forcing the flange of the inner shell into a tight contact with an abutment of said outer shell; said packing means for the said bearing including a spring attached to said drive member, a member attached to the spring, a second member surrounding said bearing and attached to the wall of said enclosed distributor chamber, the spring forcing the last two mentioned members into close contact, and a vent through the wall of said distributor chamber and so placed as to be an outlet if said bearing packing means fails.

9. An enclosed supercharged distributor chamber for a magneto generator including an electrode, a rotary switching member, a drive member therefor, a shaft attached to said drive member, a bearing on said shaft and in a wall of said enclosed chamber, packing means for said electrode and for said bearing, said electrode packing means including an outer shell having abutments therein, an inner shell one end of which having a flange, said electrode fitting into said end, the other end being enclosed, an intermediate shell fitting into and over said outer shell and inner shell respectively, a stiff spring fitting over said inner shell and in said intermediate shell forcing the flange of the inner shell into a tight contact with an abutment of said outer shell; said packing means for the said bearing including a spring attached to said drive member, a member attached to the spring, a second member surrounding said bearing and attached to the wall of said enclosed distributor chamber, the spring forcing the last two mentioned members into close contact.

10. In a central electrode for a supercharged distributor chamber of a magneto generator, said electrode including an outer shell, a middle shell fitting into said outer shell, an inner shell being closed on one end and telescoped in said middle shell, a brush, a spring in said inner shell forcing the said brush outwardly from said inner shell, another spring placed within said middle shell forcing the inner shell into close contact with said outer shell.

WALTER J. SPENGLER.